US011228334B2

(12) United States Patent
Huang et al.

(10) Patent No.: US 11,228,334 B2
(45) Date of Patent: Jan. 18, 2022

(54) CASE STRUCTURE

(71) Applicant: PEGATRON CORPORATION, Taipei (TW)

(72) Inventors: Tsu-Hsuan Huang, Taipei (TW); Chun-Liang Yeh, Taipei (TW); Pai-Hong Chiang, Taipei (TW); Ming-Ju Chung, Taipei (TW); An-Chun Chiang, Taipei (TW); Hu-Sheng Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 163 days.

(21) Appl. No.: 16/835,358

(22) Filed: Mar. 31, 2020

(65) Prior Publication Data
US 2020/0343925 A1   Oct. 29, 2020

(30) Foreign Application Priority Data

Apr. 24, 2019   (TW) ................... 108114317

(51) Int. Cl.
*H04B 1/3888* (2015.01)
*F16F 15/067* (2006.01)

(52) U.S. Cl.
CPC ......... *H04B 1/3888* (2013.01); *F16F 15/067* (2013.01)

(58) Field of Classification Search
CPC ......... F16F 15/067; F16F 15/022; F16F 15/06
See application file for complete search history.

(56) References Cited

U.S. PATENT DOCUMENTS

| 8,469,189 | B2* | 6/2013 | Liang | .................. G06F 1/1656 |
| | | | | 206/320 |
| 2015/0108030 | A1 | 4/2015 | Yin | |
| 2017/0355507 | A1* | 12/2017 | Rivellini | ................. H01F 7/122 |

FOREIGN PATENT DOCUMENTS

| CN | 102905484 | 1/2013 |
| CN | 203968187 | 11/2014 |
| CN | 204925895 | 12/2015 |
| CN | 206481522 | 9/2017 |
| KR | 101615752 | 4/2016 |

OTHER PUBLICATIONS

"Search Report of Europe Counterpart Application", dated Jun. 26, 2020, p. 1-p. 7.
Office Action of China Counterpart Application, dated Mar. 4, 2021, pp. 1-4.

* cited by examiner

*Primary Examiner* — Keith Ferguson
(74) *Attorney, Agent, or Firm* — J.C. Patents (57) ABSTRACT

A case structure includes an inner case base, a buffer outer case and a torsional spring. The inner case base has a corner area and a fixing column located at the corner area. The buffer outer case is movably overlapped on an outer side of the corner area. The torsional spring is sleeved on the fixing column and located between the buffer outer case and the inner case base. A first end and a second end of the torsional spring are respectively connected to the buffer outer case. When the force exerted on the buffer outer case causes the buffer outer case to move relative to the inner case base, the torsional spring correspondingly deforms and stores elastic potential energy. When the force exerted on the buffer outer case disappears, the torsional spring releases the elastic potential energy to reposition the buffer outer case.

10 Claims, 6 Drawing Sheets

CASE STRUCTURE

CROSS-REFERENCE TO RELATED APPLICATION

This non-provisional application claims priority under 35 U.S.C. § 119(a) to Patent Application No. 108114317 filed in Taiwan, R.O.C. on Apr. 24, 2019, the entire contents of which are hereby incorporated by reference.

BACKGROUND

Technical Field

The application relates to a case structure, and in particular, to a case structure having a buffer outer case.

Related Art

With regard to a falling protection solution of a product, almost all existing electronic products, such as a notebook computer, a tablet computer or a handhold mobile device, are protected by covering corners of the product with a layer of foam, rubber or silicone to help absorb an impact force when the product falls onto the ground and reduce damage to the product caused by potential energy.

However, the degree of the impact that the above product can sustain is related to the thickness of the foam, rubber or silicone. If a height from which the product needs to fall is higher or the product is heavier, thicker foam, rubber or silicone needs to be used. As a result, corners of the product look quite thick and heavy, affecting the overall appearance of the product.

SUMMARY

The application provides a case structure that is capable of effectively resisting collision and being thin in appearance.

The case structure in an embodiment of application includes an inner case base, a buffer outer case and a torsional spring. The inner case base has a corner area and a fixing column located at the corner area. The buffer outer case is movably overlapped on an outer side of the corner area and suitable for moving relative to the corner area after a force is exerted on the buffer outer case. The torsional spring is sleeved on the fixing column and located between the buffer outer case and the inner case base. The torsional spring has a first end and a second end that are opposite to each other. The first end and the second end are respectively connected to the buffer outer case. The buffer outer case moves relative to the inner case base when the force exerted on the buffer outer case, the torsional spring correspondingly deforms and stores elastic potential energy. When the force exerted on the buffer outer case disappears, the torsional spring releases the elastic potential energy to reposition the buffer outer case.

In an embodiment of the application, the buffer outer case includes an L-shaped wall body, a plate body protruding from an inner side of the L-shaped wall body and two stopping portions located on the plate body. The L-shaped wall body is arranged on a periphery of the corner area. The plate body is located above the corner area. The two stopping portions are located near the two ends of the torsional spring and located between two inner surfaces of the L-shaped wall body.

In an embodiment of the application, the buffer outer case includes an L-shaped wall body and a plate body protruding from an inner side of the L-shaped wall body. The plate body has a notch. The fixing column and a part of the torsional spring are located in the notch.

In an embodiment of the application, the inner case base includes two outer walls connecting two sides of the corner area. The buffer outer case protrudes from the two outer walls.

In an embodiment of the application, the buffer outer case protrudes 1 mm to 3 mm from the two outer walls.

In an embodiment of the application, there are two gaps between the buffer outer case and the two outer walls. The buffer outer case is suitable for moving relative to the inner case base to change widths of the two gaps.

In an embodiment of the application, the case structure further includes a flexible pad arranged in the buffer outer case. After a plate body is inserted into the flexible pad, the flexible pad and the buffer outer case are assembled together on the corner area of the inner case base. The flexible pad has a first through hole sleeved on the fixing column.

In an embodiment of the application, the inner case base includes two outer walls connecting two sides of the corner area. There are two gaps between the buffer outer case and the two outer walls. The flexible pad includes two decoration portions, respectively filling in the two gaps.

In an embodiment of the application, one of the inner case base and the flexible pad includes an embedding groove and the other includes an embedding block corresponding to the embedding groove.

In an embodiment of the application, the case structure further includes a cover plate arranged on the flexible pad. The fixing column has a screw hole and the cover plate has a second through hole corresponding to the screw hole.

Based on the above, the case structure in an embodiment of the application is sleeved on the fixing column of the inner case base through the torsional spring and located between the buffer outer case and the inner case base. When the case structure is hit, due to a force exerted on the buffer outer case, the buffer outer case moves relative to the inner case base, the torsional spring correspondingly deforms, and then the torsional spring recovers to reposition the buffer outer case. Compared to the conventional method in which the thicker rubber may be used to cover corners of a product, the case structure in the application resists collision through deformation of the torsional spring. Because the elasticity coefficient of the torsional spring is relatively large, the buffer outer case does not need to be very thick or protrude obviously, so that the case structure looks quite compact in appearance.

In order to make the above features and advantages of the application more comprehensible, embodiments accompanied with figures are described in detail below.

DETAILED DESCRIPTION OF THE EMBODIMENTS

Figure 1A:
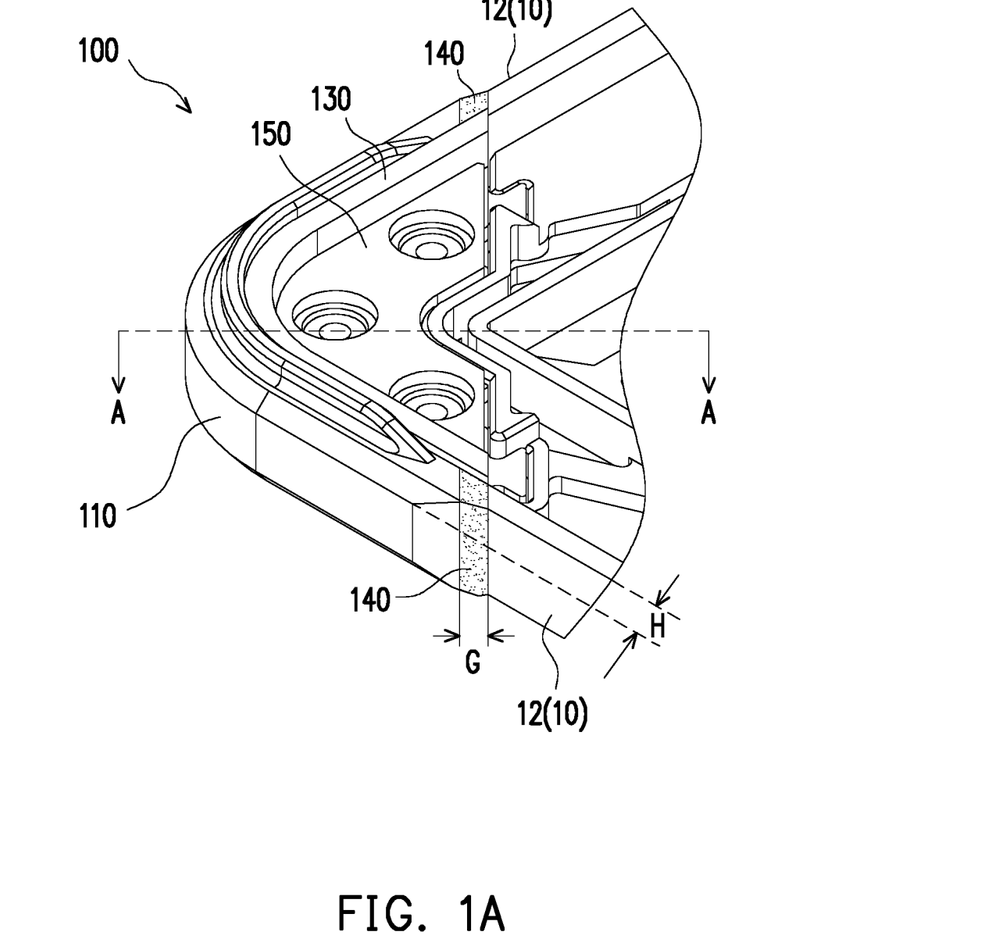
FIG. 1A is a partial schematic outside view of a case structure according to an embodiment of the application.
Figure 1B:
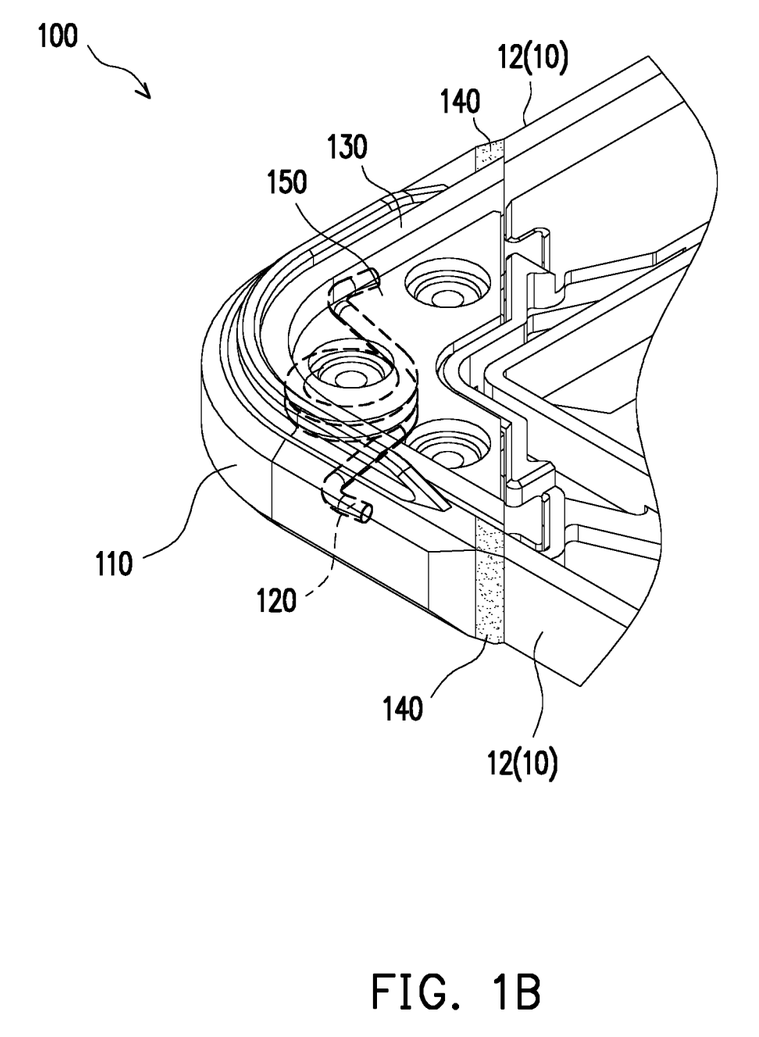
FIG. 1B is a schematic diagram of a torsional spring inside the case structure in FIG. 1A.

FIG. 1A is a partial schematic outside view of a case structure according to an embodiment of the application. FIG. 1B is a schematic diagram of a torsional spring inside the case structure in FIG. 1A. Referring to FIG. 1A and FIG. 1B, a case structure 100 in this embodiment is applicable to a case of a portable electronic device. The portable electronic device is, for example, an upper body or a lower body of a notebook computer, a tablet computer or a mobile phone. However, an application device of the case structure 100 is not limited thereto. In this embodiment, the case structure 100 has characteristics of deformability and restorability and can be used to reduce the impact of collision on electronic elements inside a product. The following provides further description.

Figure 2A:
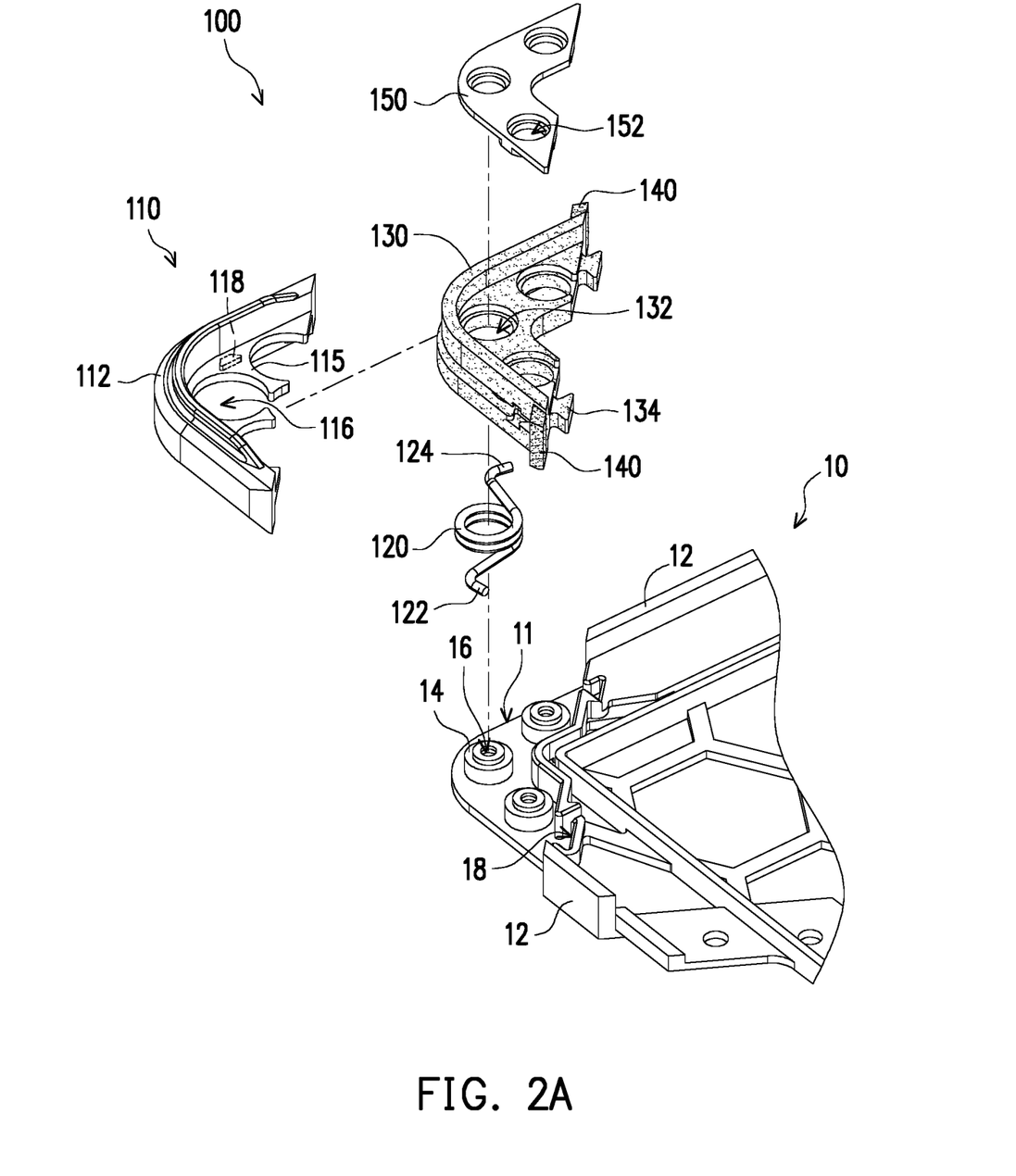
FIG. 2A is a schematic exploded view of the case structure in FIG. 1A.
Figure 2B:
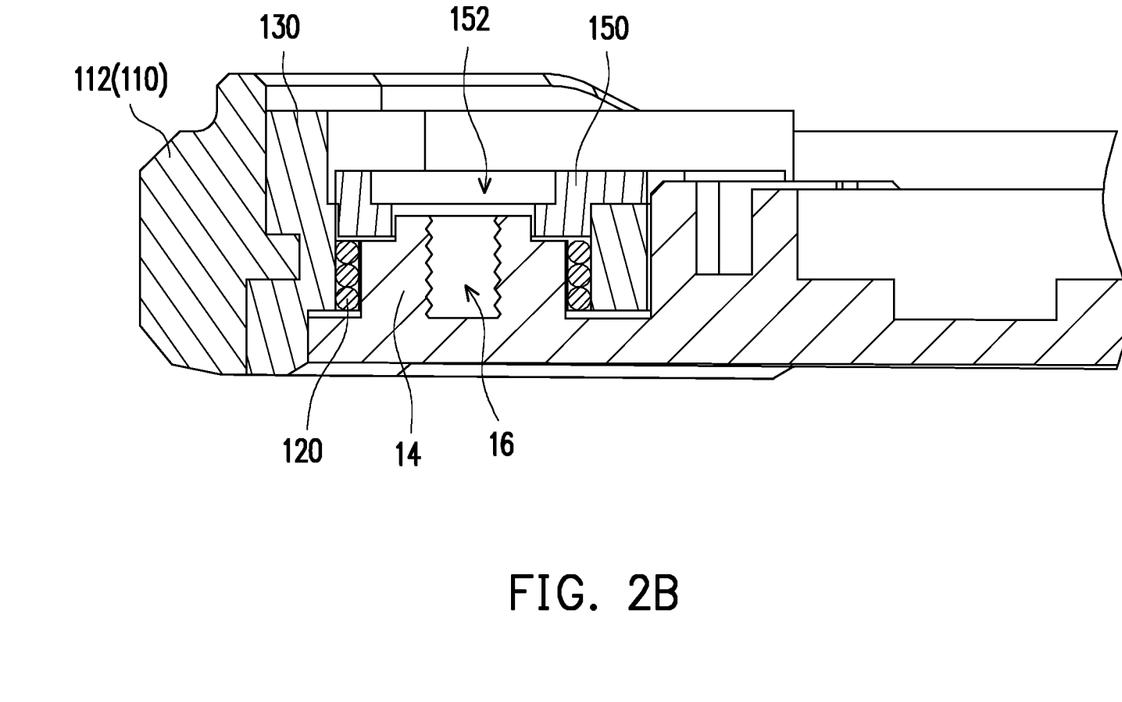
FIG. 2B is a schematic sectional view of the case structure in FIG. 1A.

FIG. 2A is a schematic exploded view of the case structure in FIG. 1A. FIG. 2B is a schematic sectional view of the case structure in FIG. 1A. Referring to FIG. 2A and FIG. 2B, the case structure 100 in this embodiment includes an inner case base 10, a buffer outer case 110 and a torsional spring 120. The inner case base 10 has a corner area 11 and a fixing column 14 located at the corner area 11. The buffer outer case 110 is movably overlapped on an outer side of the corner area 11 of the inner case base 10 and suitable for moving relative to the corner area 11 after a force is exerted on the buffer outer case 110. The torsional spring 120 is sleeved on the fixing column 14 and located between the buffer outer case 110 and the inner case base 10. A first end 122 and a second end 124 of the torsional spring 120 are respectively connected to the buffer outer case 110.

Specifically, in this embodiment, the buffer outer case 110 includes an L-shaped wall body 112 and a plate body 115 protruding from an inner side of the L-shaped wall body 112. The L-shaped wall body 112 is arranged on a periphery of the corner area 11. The plate body 115 is located above the corner area. The plate body 115 has a notch 116. The fixing column 14 and a central part of the torsional spring 120 are located in the notch 116. In this embodiment, the buffer outer case 100 is made of a crashworthy material such as a titanium alloy, an aluminum alloy, a magnesium-aluminum alloy, or polycarbonate (PC), but the material of the buffer outer case 110 is not limited thereto.

As shown in FIG. 1A, the inner case base 10 includes two outer walls 12 connecting two sides of the corner area 11. In this embodiment, the buffer outer case 110 slightly protrudes from the two outer walls 12. In this way, when the case structure 100 is hit, the buffer outer case 110 is hit prior to the outer walls 12. In the conventional method in which a material such as foam, rubber or silicone is used to cover corners of a product, an outer surface of the product generally needs to protrude at least 5 mm to 8 mm, and as a result, the corners of the product look quite thick and heavy in appearance. In this embodiment, a height H of the buffer outer case 110 protruding from the two outer walls 12 is only about 1 mm to 3 mm, so that corners of the case structure 100 in this embodiment looks quite compact in appearance.

Definitely, in other embodiments, the height H of the buffer outer case 110 protruding from the two outer walls 12 is not limited thereto. It should be noted that the buffer outer case 110 used in the case structure 100 in this embodiment may slightly protrude from the two outer walls 12, but is not limited thereto in design. In an embodiment, even though the height H of the buffer outer case 110 protruding from the two outer walls 12 is 5 mm to 8 mm, the case structure 100 is still harder to break and has a stronger buffer than a structure in the conventional method in which a material such as foam, rubber or silicone is used to cover corners of the product.

In addition, in this embodiment, there are two gaps G between the buffer outer case 110 and the two outer walls 12. When the case structure 100 is hit, the buffer outer case 110 is suitable for moving relative to the inner case base 10 to change widths of the two gaps G. That is, the gaps G between the buffer outer case 110 and the outer walls 12 are distances for the buffer outer case 110 to move relative to the inner case base 10. When the case structure 100 is hit, the buffer outer case 110 moves towards the inner case base 10 to narrow the gaps G.

As shown in FIG. 2A, in this embodiment, the case structure 100 further includes a flexible pad 130 arranged between the buffer outer case 110 and the corner area 11 of the inner case base 10. More explicitly, after the plate body 115 of the buffer outer case 110 is inserted into the flexible pad 130 first, the flexible pad 130 and the buffer outer case 110 are assembled together downward on the corner area 11 of the inner case base 10. The material of the flexible pad 130 is a flexible, compressible or deformable material such as foam, rubber or silicone, but the material of the flexible pad 130 is not limited thereto.

In this embodiment, the flexible pad 130 is fixed on the buffer outer case 110 by means of, for example, insertion, binding, clamping or double-injection. In addition, the flexible pad 130 has a first through hole 132 sleeved on the fixing column 14, so that the flexible pad 130 may pass the fixing column 14 of the inner case base 10 through the first through hole 132. Moreover, one of the inner case base 10 and the flexible pad 130 includes an embedding groove 18 and the other includes an embedding block 134 corresponding to the embedding groove 18, so that the flexible pad 130 may be fixed on the inner case base 10 through clamping between the embedding block 134 and the embedding groove 18.

In this embodiment, because the flexible pad 130 is deformable and compressible, when the case structure 100 is hit, the buffer outer case 110 may squeeze the flexible pad 130 and the flexible pad 130 may deform and be reduced, so that the buffer outer case 110 moves relative to the inner case base 10. In addition, the first end 122 and the second end 124 of the torsional spring 120 may be connected to the buffer outer case 110 through the flexible pad 130. In other embodiments, the first end 122 and the second end 124 of the torsional spring 120 may also be connected to the buffer outer case 110 through direct contact with the buffer outer case 110.

It should be noted that in this embodiment, the flexible pad 130 is used to fill a space between the buffer outer case 110 and the inner case base 10, so that the buffer outer case 110 may maintain a stable position relative to the inner case base 10 in a normal state. In the case structure 100 in this embodiment, the functions of resisting collision and buffering are mainly implemented through movement of the buffer outer case 110 due to deformation of the torsional spring 120. Therefore, in other embodiments, the flexible pad 130 of the case structure 100 may be omitted.

In addition, in this embodiment, the flexible pad 130 includes two decoration portions 140 respectively filling the two gaps G between the buffer outer case 110 and the two outer walls 12. In this way, the case structure 100 is complete in appearance and tiny particles such as dust cannot easily enter inside the case structure 100 through the gaps G. Definitely, in other embodiments, the gaps G between the buffer outer case 110 and the outer walls 12 may be exposed, which is not limited to the drawings.

In addition, in this embodiment, the case structure 100 further includes a cover plate 150 arranged on the flexible pad 130. The fixing column 14 has a screw hole 16 and the cover plate 150 has a second through hole 152 corresponding to the screw hole 16. In this embodiment, a screw (not shown in the figure) may pass the second through hole 152 of the cover plate 150 and be locked on the fixing column 14 of the inner case base 10, so that the flexible pad 130 is stably fixed on the inner case base 10 and jointly, the buffer outer case 110 fixed in the flexible pad 130 does not depart from the inner case base 10.

Figure 3:
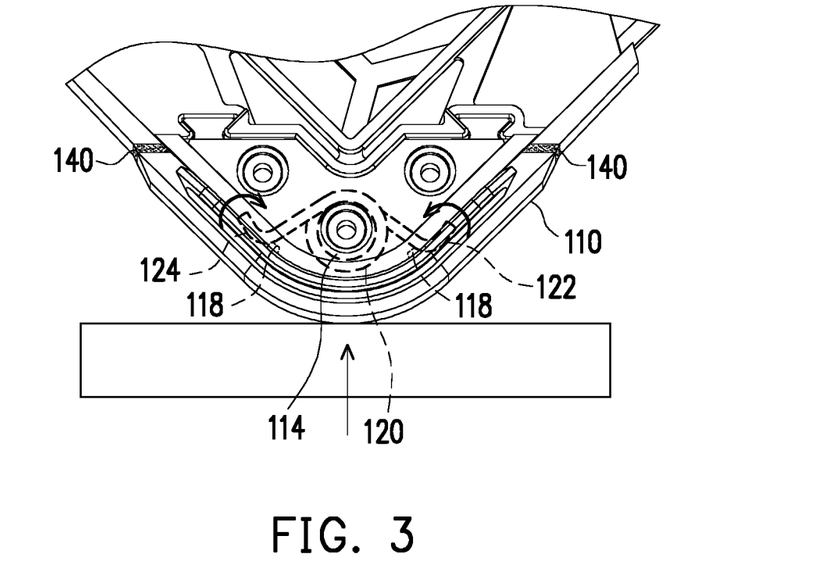
FIG. 3 to FIG. 5 are schematic diagrams of the case structure in FIG. 1A hitting the ground from different directions.
Figure 4:
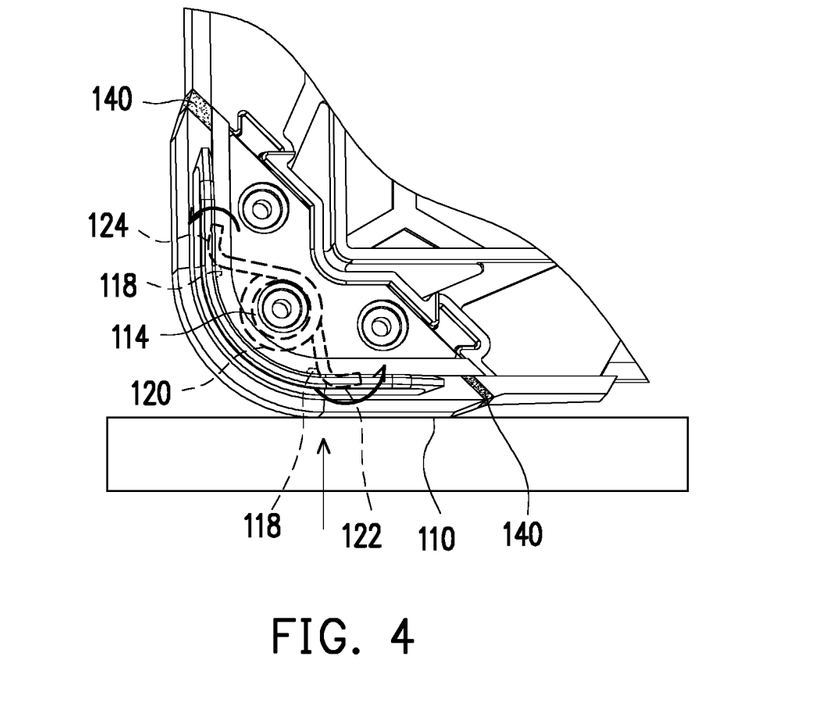
Figure 5:
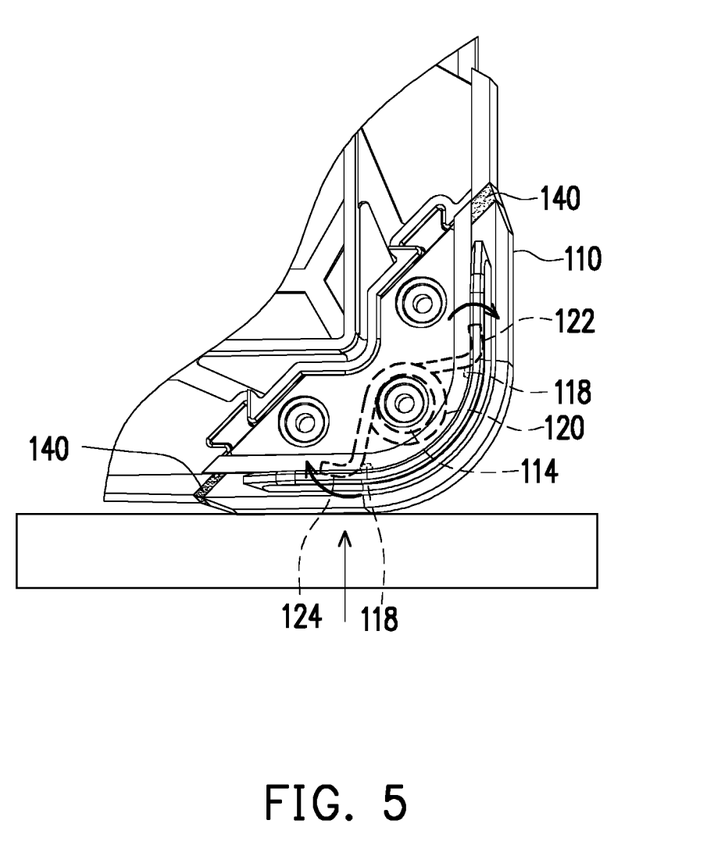

FIG. 3 to FIG. 5 are schematic diagrams of the case structure in FIG. 1A hitting the ground from different directions. Referring to FIG. 3 first, in this embodiment, when the case structure 100 is hit at a corner, the buffer outer case 110 can move relative to the corner area 11 due to a force exerted on the buffer outer case 110. In this embodiment, the first end 122 and the second end 124 of the torsional spring 120 are pushed upward jointly. In FIG. 3, the second end 124 on the left side of the torsional spring 120 deforms in a clockwise direction, the first end 122 on the right side of the torsional spring 120 deforms in a counterclockwise direction, and the deformed torsional spring 120 stores elastic potential energy. When the force exerted on the buffer outer case 110 disappears, the torsional spring 120 releases the elastic potential energy (that is, exerting an elastic restoration force) to reposition the buffer outer case 110.

Referring to FIG. 4, in this embodiment, when the case structure 100 is hit on the right side of the buffer outer case 110, the first end 122 on the right side of the torsional spring 120 in FIG. 4 is pushed by the buffer outer case 110 and directly deforms in the counterclockwise direction, so that the first end 122 on the right side of the torsional spring 122 rotates in an expansion direction. Accordingly, the second end 124 on the left side of the torsional spring 120 correspondingly rotates in a non-expansion direction and tends to deform in the counterclockwise direction. In this embodiment, to prevent the left side of the buffer outer case 110 from pulling the decoration portion 140 on the left side when rotating outward, the buffer outer case 110 includes two stopping portions 118 located on the plate body 115. The two stopping portions 118 are located near the first end 122 and the second end 124 of the torsional spring 120 and between two inner surfaces of the L-shaped wall body 112.

Therefore, when the second end 124 on the left side of the torsional spring 120 is about to deform in the counterclockwise direction, the second end 124 on the left side of the torsional spring 120 is limited by a corresponding stopping portion 118 and cannot deform in the counterclockwise direction, so that the second end 124 is prevented from pulling the decoration portion 140 on the left side. Then, when the force exerted on the buffer outer case 110 disappears, the torsional spring 120 releases the elastic potential energy (that is, exerting an elastic restoration force) to reposition the buffer outer case 110.

Referring to FIG. 5, similarly, in this embodiment, when the case structure 100 is hit on the left side of the buffer outer case 110, the second end 124 on the left side of the torsional spring 120 in FIG. 5 is pushed by the buffer outer case 110 and directly deforms in the clockwise direction, so that the second end 124 on the left side of the torsional spring 122 rotates in the expansion direction. Accordingly, the first end 122 on the right side of the torsional spring 120 correspondingly rotates in the non-expansion direction and tends to deform in the clockwise direction. When the first end 122 on the right side of the torsional spring 120 is about to deform in the clockwise direction, the first end 122 on the right side of the torsional spring 120 is limited by a corresponding stopping portion 118 and cannot deform in the clockwise direction, so that the first end 122 is prevented from pulling the decoration portion 140 on the right side. Then, when the force exerted on the buffer outer case 110 disappears, the torsional spring 120 releases the elastic potential energy (that is, exerting an elastic restoration force) to reposition the buffer outer case 110. Definitely, in other embodiments, the stopping portions 118 of the case structure 100 may be omitted.

The case structure 100 in this embodiment uses the torsional spring 120 to absorb impact energy caused by falling and reduce a displacement caused by the impact energy. In this way, the height of the buffer outer case 110 protruding from the surface of the product can be reduced. The case structure 100 in this embodiment replaces conventional thick foam covering corners of the product, so that the product looks more beautiful. In addition, a designer may select a torsional spring 120 with a different elasticity coefficient according to a demand. If a relatively strong impact force needs to be borne, a torsional spring 120 with a high elasticity coefficient may be selected, to satisfy the demand for light appearance and a slight protrusion. If a relatively weak impact force needs to be borne, a torsional spring 120 with a low elasticity coefficient may be selected, to reduce costs.

It is proved that the case structure 100 in this embodiment can pass a military-level drop test. After being dropped from 183 cm with all faces, all sides and all corners facing down in a total of 26 times, a product with the case structure 100 can still successfully start up. Therefore, the case structure 100 can provide good functions of anti-collision and shatter resistance.

In conclusion, the case structure in an embodiment of the application is sleeved on the fixing column of the inner case base through the torsional spring and located between the buffer outer case and the inner case base. When the case structure is hit, due to a force exerted on the buffer outer case, the buffer outer case moves relative to the inner case base, the torsional spring correspondingly deforms, and then the torsional spring recovers to reposition the buffer outer case. Compared to the conventional method in which the thicker rubber may be used to cover corners of a product, the case structure in an embodiment of the application resists collision through deformation of the torsional spring. Because the elasticity coefficient of the torsional spring is relatively large, the buffer outer case does not need to be very thick or protrude obviously, so that the case structure looks quite compact in appearance.

Although the application has been disclosed above through the embodiments, the embodiments are not intended to limit the application. Any person of ordinary skill in the art can make some alterations or modifications without departing from the spirit and scope of the application. Therefore, the protection scope of the application shall be subject to the appended claims.

What is claimed is:

1. A case structure, comprising:
   an inner case base, having a corner area and a fixing column located at the corner area;
   a buffer outer case, movably overlapped on an outer side of the corner area and suitable for moving relative to the corner area after a force is exerted on the buffer outer case; and
   a torsional spring, sleeved on the fixing column and located between the buffer outer case and the inner case base, wherein the torsional spring has a first end and a second end that are opposite to each other and the first end and the second end are respectively connected to the buffer outer case, wherein the buffer outer case moves relative to the inner case base when the force exerted on the buffer outer case, the torsional spring correspondingly deforms and stores elastic potential energy, and when the force exerted on the buffer outer case disappears, the torsional spring releases the elastic potential energy to reposition the buffer outer case.

2. The case structure according to claim 1, wherein the buffer outer case comprises an L-shaped wall body, a plate body protruding from an inner side of the L-shaped wall body and two stopping portions located on the plate body, the L-shaped wall body covers a periphery of the corner area, the plate body is overlapped on the corner area, and the two stopping portions are located near the first end and the second end of the torsional spring and between two inner surfaces of the L-shaped wall body.

3. The case structure according to claim 1, wherein the buffer outer case comprises an L-shaped wall body and a plate body protruding from an inner side of the L-shaped wall body, the plate body has a notch, and the fixing column and a part of the torsional spring are located in the notch.

4. The case structure according to claim 1, wherein the inner case base comprises two outer walls connecting two sides of the corner area and the buffer outer case protrudes from the two outer walls.

5. The case structure according to claim 4, wherein the buffer outer case protrudes 1 mm to 3 mm from the two outer walls.

6. The case structure according to claim 4, wherein there are two gaps between the buffer outer case and the two outer walls and the buffer outer case is suitable for moving relative to the inner case base to change widths of the two gaps.

7. The case structure according to claim 1, wherein the buffer outer case comprises a plate body and the case structure further comprises:
 a flexible pad, arranged in the buffer outer case, wherein after the plate body is inserted into the flexible pad, the flexible pad and the buffer outer case are assembled together at the corner area of the inner case base, and the flexible pad has a first through hole sleeved on the fixing column.

8. The case structure according to claim 7, wherein the inner case base comprises two outer walls connecting two sides of the corner area, there are two gaps between the buffer outer case and the two outer walls, and the flexible pad comprises two decoration portions respectively filling in the two gaps.

9. The case structure according to claim 7, wherein one of the inner case base and the flexible pad comprises an embedding groove and the other comprises an embedding block corresponding to the embedding groove.

10. The case structure according to claim 7, further comprising:
 a cover plate, arranged on the flexible pad, wherein the fixing column has a screw hole and the cover plate has a second through hole corresponding to the screw hole.

\* \* \* \* \*